United States Patent

Machi et al.

[11] 4,354,907
[45] Oct. 19, 1982

[54] RADIATION POLYMERIZATION OF CATIONIC MONOMER IN AQUEOUS ALCOHOL

[75] Inventors: Sueo Machi, Takasaki; Isao Ishigaki, Meabashi; Toshimi Okada, Kakogawa; Shigeaki Washio, Kobe, all of Japan

[73] Assignees: Japan Atomic Energy Research Institute, Tokyo; Taki Chemical Co., Ltd., Kakogawa, both of Japan

[21] Appl. No.: 118,967

[22] Filed: Feb. 5, 1980

[30] Foreign Application Priority Data

Feb. 5, 1979 [JP] Japan ............................ 54-11977

[51] Int. Cl.$^3$ .............................................. C08F 2/46
[52] U.S. Cl. ............................. 204/159.22; 526/210
[58] Field of Search ................................ 204/159.22

[56] References Cited

U.S. PATENT DOCUMENTS

| | | | |
|---|---|---|---|
| 2,504,074 | 4/1950 | Jones | 204/159.22 |
| 3,573,183 | 3/1971 | Kagiya et al. | 204/159.22 |
| 3,716,524 | 2/1973 | Cenci | 204/159.22 |
| 3,841,401 | 10/1974 | Restaino et al. | 166/247 |
| 3,926,756 | 12/1975 | Restaino | 204/159.22 |
| 3,963,685 | 6/1976 | Abrahams | 204/159.22 |
| 4,058,491 | 11/1977 | Stecker | 204/159.22 |
| 4,137,969 | 2/1979 | Phalangas et al. | 204/159.22 |
| 4,178,221 | 12/1979 | Boutin et al. | 204/159.22 |

Primary Examiner—Paul Lieberman
Assistant Examiner—A. H. Koeckert
Attorney, Agent, or Firm—Browdy and Neimark

[57] ABSTRACT

A process for the production of water-soluble, substantially solid, cationic polymers comprises the step of irradiating an aqueous solution with ionizing radiation, the aqueous solution comprising at least 50% by weight of one, or two or more of specific type of amino ester or esters optionally being accompanied by acrylamide, and at least 0.1% by weight of a specific type of alcohol as an agent for inhibiting water-insolubility of the resulting polymer.

The amino esters have the generic formula

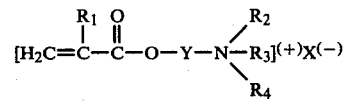

wherein $R_1$ represents a hydrogen atom or a methyl group; $R_2$ represents a hydrogen atom or an alkyl group having 1-4 carbon atoms; $R_3$ and $R_4$ each represents an alkyl group having 1-4 carbon atoms and $x^{(-)}$ represents an anion; or from the combination of at least one of said amino esters and acrylamide.

The alcohols have the formula

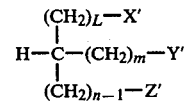

wherein X', Y' and Z' each represents a hydrogen atom or a hydroxyl group, providing at least one of said X', Y' and Z' is OH; and L, m and n each represents a natural number; and include isopropyl alcohol, isobutyl alcohol, sec. butyl alcohol, glycerine and propylene glycol.

5 Claims, No Drawings

RADIATION POLYMERIZATION OF CATIONIC MONOMER IN AQUEOUS ALCOHOL

BACKGROUND OF THE INVENTION

1. Field of the Invention

This invention relates to a process for the production of water-soluble cationic polymers. More particularly the invention relates to a process for producing water-soluble, substantially solid, cationic polymers by irradiating a high concentration aqueous solution of a monomer or monomers selected from the group consisting of tertiary and quaternary salts of aminoalkyl acrylate and aminoalkyl methacrylate, said monomer solution optionally containing acrylamide, with ionizing radiation in the presence of a specifically selected alcohol.

2. Description of Prior Art

Cationic polymers of the tertiary or quaternary salts of aminoalkyl acrylate or methacrylate having the generic formula:

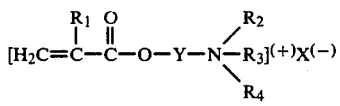

wherein, $R_1$ represents a hydrogen atom or a methyl group; $R_2$ represents a hydrogen atom or an alkyl group having 1–4 carbon atoms; $R_3$ and $R_4$ each represents an alkyl group having 1–4 carbon atoms; Y represents an alkylene group having 1–4 carbon atoms and $X^{(-)}$ represents an anion; or cationic copolymers of said tertiary or quaternary salts with acrylamide, are known. Such cationic polymers have a variety of uses as a high polymeric flocculant material to be used in industrial water, in service water or in sewage, or in the field of mining, public works and the like for the purposes of promoting settling out or floating upwards of fine particles suspended in each liquid, or they can also be used as a dewatering aid for sludge from waste water purification process.

These cationic polymers or copolymers have hitherto been prepared by solution-polymerization in water under irradiation or in the presence of an initiator of polymerization such as a peroxide or a redox catalyst. These methods of polymerization, however, have defects in that since the polymerization is carried out in the solution of relatively low monomer concentration, the polymer is obtained as a mass in the state of a gel accompanied by a large amount of water, and accordingly the molecular weight thereof decreases as time elapses and in addition, since the mass is in the state of a gel, it is expensive to transport it.

For these reasons, it has been proposed and tried to separate solid polymer from the mass in the state of a gel containing water by means of, for example, the precipitation of the solid polymer in an organic solvent such as methanol and acetone, or alternatively by drying the gelatinous mass in hot air to remove water therefrom. In any of these methods, complicated additional steps are generally required to follow the step of the aqueous solution polymerization and improvement of these points has been desired.

As a result of thorough investigation with respect to the production of cationic polymers by irradiation, we have found that it is possible to obtain a substantially solid polymer in yield of 100% by irradiating a highly concentrated aqueous solution of at least one member selected from the group consisting of tertiary and quaternary salts of aminoalkyl acrylate and methacrylate, or a mixture of said member and acrylamide. However, the polymer thus obtained is water-insoluble and therefore its use is limited to only a few industrial applications.

Hereupon, we have further studied to find a method of preventing the product polymer from becoming water-insoluble and have finally found that it is possible to obtain a water-soluble polymer if we carry out the polymerization by irradiating an aqueous high concentration solution of a monomer or monomers with ionizing radiation in the presence of a specific alcohol under specific conditions. Based on this discovery, the present invention has been accomplished.

SUMMARY OF THE INVENTION

Namely, the process of the present invention is characterized in that it comprises the step of irradiating an aqueous solution with ionizing radiation, said solution containing at least 50% by weight of a single monomer or a mixture of monomers selected from the amino esters having the generic formula:

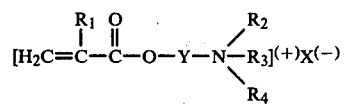

wherein $R_1$ represents a hydrogen atom or a methyl group; $R_2$ represents a hydrogen atom or an alkyl group having 1–4 carbon atoms; $R_3$ and $R_4$ each represents an alkyl group having 1–4 carbon atoms; Y represents an alkylene group having 1–4 carbon atoms and $X^{(-)}$ represents an anion; or a mixture of said monomer or monomers and acrylamide, said irradiation being carried out in the presence of at least 0.1% by weight of an alcohol also contained therein having the generic formula:

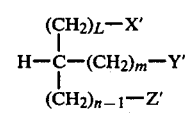

wherein X', Y' and Z' each represents a hydrogen atom or a hydroxyl group, providing at least one of said X', Y' and Z' is OH; and L, m and n each represents a natural number; said irradation with ionizing radiation being carried out under the conditions including an initial temperature of 60° C. or lower, an irradiation dose rate of 500–200,000 rads/Hr, and a total dose of 1,000–300,000 rads.

The cationic polymers of the present invention can be prepared from one, or two or more amino esters having the generic formula:

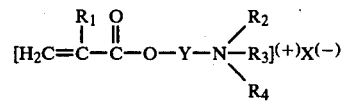

wherein $R_1$ represents a hydrogen atom or a methyl group; $R_2$ represents a hydrogen atom or an alkyl group having 1–4 carbon atoms; $R_3$ and $R_4$ each represents an alkyl group having 1–4 carbon atoms and $X^{(-)}$ represents an anion; or from the combinations of at least one of said amino esters and acrylamide. Representative examples of the above mentioned compounds include the tertiary salts such as the hydrochlorides, sulfates and acetates of dimethylaminoethyl acrylate, dimethylaminoethyl methacrylate, diethylaminoethyl acrylate and diethylaminoethyl methacrylate; and the quaternary salts of said monomers mentioned above with respect to the tertiary salts which have been quaternarized by methyl chloride, dimethyl sulfate, diethyl sulfate or the like.

When copolymers are to be prepared from the mixtures of monomeric amino ester or esters and acrylamide, the copolymers having any desired degree of cationic strength can be prepared by varying the mixing ratio of the component monomers. Namely, since acrylamide is essentially nonionic, a highly cationic copolymer can be produced by decreasing the proportion of acrylamide component in the original mixture of monomers.

The concentration of monomer(s) of the solution at the initial period of polymerization has influence on the molecular weight and the state of the resulting polymer. The higher the concentration of monomer or monomers, the larger the molecular weight of the resulting polymer and the smaller the amount of water contained therein. Thus, the resulting polymer becomes more and more solid-like, correspondingly.

In the practice of the present invention, the concentration of monomer is preferably at least 50% by weight based on the total weight of the aqueous solution. In order to make the handling more easy, the concentration of at least 70% by weight is desirable. If the concentration is too low, in the range below the lower limit, the molecular weight of the resulting copolymer decreases and a solid polymer cannot be obtained. The upper limit of the concentration of monomer should be below the saturation point of the solution containing the monomer specifically used. The operation is impossible if the concentration exceeds the upper limit.

According to the present invention, the aqueous solution of the monomer having the concentration within the range mentioned above is irradiated with ionizing radiation in the presence of a specific water-soluble alcohol. By this, the production of solid, water-soluble, cationic polymers is ensured.

The water-soluble alcohols useful in the practice of the invention can be represented by the generic formula:

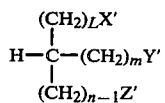

wherein $X'$, $Y'$ and $Z'$ each represents H or OH, providing that at least one of $X'$, $Y'$ and $Z'$ represents OH; and L, m and n each represents a positive integer. Representative examples of these alcohols include isopropyl alcohol, isobutyl alcohol, secondary butyl alcohol, glycerine, propylene glycol and the like. A mixture of two or more alcohols selected from these can of course be used in the practice of the present invention.

Though the amount of alcohol which can be employed in the practice of the present invention can be varied depending on the type of alcohol specifically used, the type of monomer specifically used, the conditions under which irradiation is carried out, the desired molecular weight of the resulting polymer and the like, the amount of alcohol generally employed is in the range of 0.1-20% by weight. If the amount of alcohol added is below said lower limit, the advantage of the invention cannot be expected. If the amount of alcohol exceeds the upper limit given above, the molecular weight of the resulting polymer remarkably decreases and the polymer is not useful for practical applications.

The use of such special types of alcohol as mentioned above is essential. If an n-alcohol such as methanol, ethanol or n-propanol etc., is used, it is almost impossible to effectively prevent the resulting polymer from becoming water-insoluble.

Representative examples of ionizing radiation which can be used in the practice of the invention include gamma-rays, accelerated electron beams, X-rays and the like.

The irradiation dose rate has influence on the molecular weight of the resulting polymer. Generally, the production of the polymer of a higher molecular weight requires the use of a lower dose rate. Namely, the lower the dose rate, the higher the viscosity of the solution of cationic polymer, providing all the other conditions are the same. On the other hand, the higher the dose rate, the shorter the time required for the completion of converting from the monomer to the polymer.

When the industrial production of cationic polymer useful as an agent for treating water is intended, the dose rate should be in the range of 500–200,000 rads/Hr. If the dose rate below 500 rads/Hr is employed, the time required to complete the reaction will be too long to be industrially feasible. If the dose rate exceeds 200,000 rads/Hr, at least part of the polymer product will become water-insoluble or the molecular weight of the resulting polymer will be reduced in spite of the presence of a specific alcohol. The total dose should be in the range of 1,000–300,000 rads. If it is below 1,000 rads, yield of polymerization is small, and if it exceeds 300,000 rads, at least part of the resulting polymer will become water-insoluble or the molecular weight of the resulting polymer will be reduced in spite of the presence of the specific type of alcohol added according to the invention.

The temperature of the solution before being subjected to ionizing radiation (namely, temperature at the initiation of polymerizing reaction) should be in the range of 0°–60° C. If the temperature is below 0° C., it is difficult to dissolve the monomer in the solution. If the temperature is above 60° C., the molecular weight of the resulting polymer decreases substantially and the product cannot be useful as an agent for treating water.

DETAILED DESCRIPTION OF THE INVENTION

The method of this invention is now described in greater detail by reference to the following examples which are given for illustrative purposes only and are by no means intended to limit the scope of the invention.

EXAMPLE 1

20 ml of demineralized water was placed in a 200 ml-capacity beaker and 80 g of methyl chloride salt of dimethylaminoethyl methacrylate and 4 g of isopropyl alcohol were added thereto to be dissolved therein. Then, the solution was placed in a vessel used for irradiation and nitrogen was blown into the solution for 20 minutes. The temperature of the solution was adjusted to 30° C. and the solution was irradiated with gamma-rays from cobalt-60 at a dose rate of 5,000 rads/Hr for 3 hours.

The conversion of the monomer into the intended polymer was 97.8%. The powdered product obtained by pluverizing the polymer was soluble in distilled water. When the polymer content determined in a 1 N-NaNO$_3$ solution at 30° C. was 0.5 g/dl, the reduced viscosity was 8.5 dl/g.

EXAMPLE 2

20 ml of demineralized water was placed in a 200 ml-capacity beaker and 40 g of methyl chloride salt of dimethylaminoethyl methacrylate, 40 g of acrylamide and 4 g of isobutyl alcohol were added to be dissolved therein. Then the solution was placed in a vessel used for irradiation and nitrogen was blown into the solution for 20 minutes. The temperature of the solution was adjusted to 30° C. and the solution was irradiated with gamma-rays from cobalt-60 at a dose rate of 5,000 rads/Hr for 3 hours.

The conversion of the monomer into the polymer was 95.3%. The powdered product of the polymer was soluble in distilled water. When the polymer content determined in a 1 N-NaNO$_3$ solution at 30° C. was 0.5 g/dl, the reduced viscosity was 8.2 dl/g.

EXAMPLE 3

20 ml of demineralized water was placed in a 200 ml-capacity beaker and 60 g of methyl chloride salt of dimethylaminoethyl methacrylate, 20 g of acrylamide and 2 g of isobutyl alcohol were added thereto. Then, the solution was placed in a vessel used for irradiation and nitrogen was blown into the solution for 20 minutes. The temperature of the solution was adjusted to 30° C. and the solution was irradiated with gamma-rays from cesium-137 at a dose rate of 5,000 rads/Hr for 5 hours. The convension of the monomer to the polymer was 95.7%. The powdered product of the polymer was soluble in distilled water. When the polymer content determined in a 1 N-NaNO$_3$ solution at 30° C. was 0.5 g/dl, the reduced viscosity was 10.6 dl/g.

EXAMPLE 4

20 ml of demineralized water was placed in a 200 ml-capacity beaker and 40 g of methyl chloride salt of dimethylaminoethyl methacrylate, 40 g of acrylamide and 10 g of glycerine were added thereto. Then, the solution was placed in a vessel used for irradiation and was irradiated with gamma-rays from cobalt-60 at a dose rate of 5,000 rads/Hr for 3 hours. The conversion of the monomer into the polymer was 94.3%. The powdered product of the polymer was soluble in distilled water. When the polymer content determined in a 1 N-NaNO$_3$ solution at 30° C. was 0.5 g/dl, the reduced viscosity was 14.5 dl/g.

EXAMPLES 5–15

The monomer and alcohol were added to demineralized water according to the conditions as set forth in Table 1. Nitrogen was blown into the resulting solution for 20 minutes before the vessel containing the solution was closed. Then, the solution was subjected to irradiation at a predetermined dose rate for a predetermined time each as set forth in the table mentioned above. When irradiation was finished, the irradiated sample was taken out of the vessel and reduced viscosity of the polymer and the conversion of the monomer to the polymer were measured. The reduced viscosity is the value at the time when the polymer content determined in a 1 N-NaNO$_3$ solution at 30° C. was 0.5 g/dl. These conditions and results are shown in Table 1 below.

TABLE 1

| Example No. | Water (ml) | DMAEN—MC (g) | DMAEN—DMS (g) | DEAEM—MC (g) | Acrylamide (g) | Isopropyl alcohol (g) | Isobutyl alcohol (g) | Secondary butyl alcohol (g) | Monomer content (%) |
|---|---|---|---|---|---|---|---|---|---|
| 5 | 20 | 40 | | | 40 | 2 | | | 78.4 |
| 6 | 20 | 40 | | | 40 | 1 | | | 79.2 |
| 7 | 20 | 40 | | | 40 | | 4 | | 76.9 |
| 8 | 20 | 40 | | | 40 | | 4 | | 76.9 |
| 9 | 20 | 41 | | | 41 | 2 | | | 80.4 |
| 10 | 20 | | | 80 | | | | 4 | 76.9 |
| 11 | 20 | | | 80 | | | 4 | | 76.9 |
| 12 | 15 | 85 | | | | | 1 | | 84.2 |
| 13 | 20 | | 60 | | 20 | | 2 | | 78.4 |
| 14 | 20 | | 20 | | 60 | 4 | | | 76.9 |
| 15 | 20 | 10 | | | 70 | 4 | | | 76.9 |

| Example No. | Irradiation dose rate (rad/Hr) | Irradiation time (Hr) | Polymerization temperature (°C.) | Conversion (%) | Water solubility | Reduced viscosity (dl/g) |
|---|---|---|---|---|---|---|
| 5 | 5,000 | 3 | 30 | 98.0 | soluble | 10.4 |
| 6 | 5,000 | 3 | 30 | 99.1 | " | 14.8 |
| 7 | 10,000 | 2 | 30 | 97.8 | " | 7.3 |
| 8 | 500 | 10 | 50 | 95.1 | " | 10.2 |
| 9 | 5,000 | 3 | 50 | 94.6 | " | 11.5 |
| 10 | 5,000 | 3 | 30 | 96.2 | " | 5.1 |
| 11 | 5,000 | 3 | 30 | 95.8 | " | 6.0 |
| 12 | 5,000 | 3 | 30 | 98.6 | " | 9.8 |
| 13 | 5,000 | 3 | 30 | 98.3 | " | 8.2 |
| 14 | 5,000 | 3 | 50 | 96.7 | " | 9.8 |
| 15 | 5,000 | 3 | 50 | 96.0 | " | 12.5 |

Notes:
DMAEM—MC Dimethylaminoethyl methacrylate Methyl chloride salt
DMAEM—DMS Dimethylaminoethyl methacrylate Dimethyl sulfate salt
DEAEM—MC Diethylaminoethyl methacrylate Methyl chloride salt

REFERENCE EXAMPLE 1

The experiment was carried out in the same manner as in Example 1 except that 4 g of ethanol was used instead of isopropyl alcohol in Example 1. 0.5 g of powder of the resulting polymer was mixed with 100 g of distilled water and agitated for 2 hours, while the temperature was kept at 30° C. It was observed that the polymer was slightly swollen with water but the polymer was substantially water-insoluble.

REFERENCE EXAMPLE 2

The experiment was carried out in the same manner as in Example 2 except that the temperature after the blowing-in of nitrogen (namely, the initial temperature) was adjusted to 70° C. The reduced viscosity of the resulting polymer as determined in the same manner as in Example 2 was 2.3 dl/g.

REFERENCE EXAMPLE 3

The experiment was carried out in the same manner as in Example 3 except that the irradiation time of gamma-rays was 7 hours instead of 5 hours.

0.5 g of the resulting powdered polymer was mixed with 100 g of distilled water and was agitated for 2 hours, while the temperature was kept at 30° C. It was observed that the polymer was slightly swollen with water, but the polymer was substantially water-insoluble.

What is claimed is:

1. A process for the production of water-soluble, substantially solid cationic polymers comprising the step of irradiating an aqueous solution containing (1) at least 50% by weight but below the saturation point of one, or two or more of amino esters selected from those compounds having the generic formula:

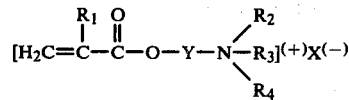

wherein $R_1$ represents a hydrogen atom or a methyl group; $R_2$ represents a hydrogen atom or an alkyl group having 1–4 carbon atoms; $R_3$ and $R_4$ each represents an alkyl group having 1–4 carbon atoms; Y represents an alkylene group having 1–4 carbon atoms; and $X^{(-)}$ represents an anion; or a mixture of said amino ester or esters with acrylamide; and (2) at least 0.1% by weight of an alcohol having the generic formula:

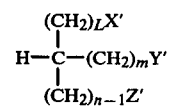

wherein $X'$, $Y'$ and $Z'$ each represents H or OH, providing at least one of $X'$, $Y'$ and $Z'$ is OH, and L, m and n each represents a positive integer; said irradiation being carried out at an initial reaction temperature in the range of 0°–60° C. with ionizing radiation rate in the range of 500–200,000 rads/Hr, and a total irradiation dose rate in the range of 1,000–300,000 rads.

2. The process as defined in claim 1 wherein the irradiation is carried out for a total dose in the range of 1,000–300,000 rads.

3. The process as defined in claim 2 wherein the irradiation is carried out for a total dose in the range of 1,000–300,000 rads/Hr.

4. The process as defined in claim 1 wherein the concentration of said one or more amino esters or mixture thereof with acrylamide is at least 70% by weight.

5. The process as defined in claim 1 wherein said alcohol is selected from the group consisting of isopropyl alcohol, isobutyl alcohol, sec. butyl alcohol, glycerine and propylene glycol, and the quantity of said alcohol is 0.1–20% by weight.

* * * * *